US008673999B2

(12) United States Patent
Schmatloch

(10) Patent No.: US 8,673,999 B2
(45) Date of Patent: Mar. 18, 2014

(54) WATER BASED PRIMER COMPOSITION FOR ISOCYANTE AND SILANE FUNCTIONAL ADHESIVES

(75) Inventor: Stefan Schmatloch, Thalwil (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/577,668

(22) PCT Filed: Mar. 4, 2011

(86) PCT No.: PCT/US2011/027158
§ 371 (c)(1),
(2), (4) Date: Aug. 8, 2012

(87) PCT Pub. No.: WO2011/112440
PCT Pub. Date: Sep. 15, 2011

(65) Prior Publication Data
US 2012/0318436 A1    Dec. 20, 2012

Related U.S. Application Data

(60) Provisional application No. 61/311,509, filed on Mar. 8, 2010.

(51) Int. Cl.
| | | |
|---|---|---|
| C09J 175/04 | (2006.01) | |
| C09J 183/04 | (2006.01) | |
| C08L 83/08 | (2006.01) | |
| C08G 18/10 | (2006.01) | |
| C03C 17/32 | (2006.01) | |
| C08K 5/544 | (2006.01) | |
| C08K 5/05 | (2006.01) | |
| C09J 183/08 | (2006.01) | |

(52) U.S. Cl.
CPC .............. *C09J 183/08* (2013.01); *C09J 175/04* (2013.01); *C08L 83/08* (2013.01); *C08G 18/10* (2013.01); *C03C 17/32* (2013.01); *C03C 17/322* (2013.01); *C08K 5/544* (2013.01); *C08K 5/05* (2013.01)
USPC ....... 523/168; 523/333; 524/188; 106/287.11

(58) Field of Classification Search
USPC .............. 106/287.11; 523/168, 333; 524/188
See application file for complete search history.

(56) References Cited

U.S. PATENT DOCUMENTS

| 3,971,751 | A | 7/1976 | Isayama et al. |
|---|---|---|---|
| 4,345,053 | A | 8/1982 | Rizk et al. |
| 4,374,237 | A | 2/1983 | Berger et al. |
| 4,541,936 | A | 9/1985 | Ona et al. |
| 4,622,369 | A | 11/1986 | Chang |
| 4,625,012 | A | 11/1986 | Rizk et al. |
| 4,645,816 | A | 2/1987 | Pohl |
| 4,687,533 | A | 8/1987 | Rizk et al. |
| 4,780,520 | A | 10/1988 | Rizk et al. |
| 4,788,254 | A | 11/1988 | Kawakubo |
| 4,906,707 | A | 3/1990 | Yukimoto et al. |
| 4,923,927 | A | 5/1990 | Hirose et al. |
| 5,011,900 | A | 4/1991 | Yukimoto et al. |
| 5,063,270 | A | 11/1991 | Yukimoto et al. |
| 5,223,597 | A | 6/1993 | Iwakiri et al. |
| 5,063,269 | A | 12/1993 | Amano |
| 5,342,914 | A | 8/1994 | Iwakiri et al. |
| 5,409,995 | A | 4/1995 | Iwahara et al. |
| 5,567,833 | A | 10/1996 | Iwahara et al. |
| 5,603,798 | A | 2/1997 | Bhat |
| 5,623,044 | A | 4/1997 | Chiao |
| 5,650,467 | A | 7/1997 | Suzuki et al. |
| 5,679,147 | A | 10/1997 | Standke et al. |
| 5,844,115 | A | 12/1998 | Moody et al. |
| 5,852,137 | A | 12/1998 | Hsieh et al. |
| 5,976,305 | A | 11/1999 | Bhat et al. |
| 6,512,033 | B1 | 1/2003 | Wu |
| 6,521,699 | B2 | 2/2003 | Feder et al. |
| 6,534,667 | B1 | 3/2003 | Standke et al. |
| 6,828,403 | B2 | 12/2004 | Mahdi et al. |
| 2002/0100550 | A1 | 8/2002 | Mahdi et al. |
| 2005/0126683 | A1 | 6/2005 | Hsieh et al. |
| 2006/0124225 | A1 | 6/2006 | Wu et al. |

(Continued)

FOREIGN PATENT DOCUMENTS

| EP | 0 859 029 A2 | 8/1998 |
|---|---|---|
| EP | 0 716 128 B1 | 12/2002 |
| EP | 1 031 593 B1 | 10/2003 |
| EP | 1 760 129 A1 | 3/2007 |
| EP | 1 894 966 A1 | 3/2008 |
| WO | 98/13410 A1 | 4/1998 |
| WO | 2008/037780 A3 | 4/2008 |
| WO | 2008/088647 A1 | 7/2008 |
| WO | 2009/055019 A1 | 4/2009 |
| WO | 2011/112440 A1 | 9/2011 |

OTHER PUBLICATIONS

Corresponding PCT Application No. US2011/027158 filed Mar. 4, 2011; Published as WO 2011/112440 on Sep. 15, 2011.

(Continued)

*Primary Examiner* — David M Brunsman
(74) *Attorney, Agent, or Firm* — The Dobrusin Law Firm, PC

(57) ABSTRACT

The present invention is directed to a unique solution for promoting adhesion of substrates to adhesives containing a prepolymer having isocyanate, silane or both functional groups. The solution comprises a composition comprising: a) from about 0.05 to about 10.0 parts by weight of a hydrolysate of one or more of alkoxysilyl amines; b) from about 0.05 to about 1.0 parts by weight of one of more alkoxylated alcohols, alkoxysilyl terminated alkoxylated alcohols, fatly acids or fatty acid esters; and, c) from about 80 to about 99.9 parts by weight of water: wherein the composition contains 100 parts by weight and the composition exhibits a pH of about 9 to about 12.

20 Claims, No Drawings

(56) References Cited

U.S. PATENT DOCUMENTS

| | | |
|---|---|---|
| 2007/0187028 A1 | 8/2007 | Braun et al. |
| 2008/0268261 A1 | 10/2008 | Schwoeppe et al. |
| 2009/0108231 A1 | 4/2009 | Gimvang |
| 2009/0226738 A1 | 9/2009 | Sutter et al. |
| 2013/0092052 A1* | 4/2013 | Friedel et al. ............ 106/287.11 |

OTHER PUBLICATIONS

International Search Report and Written Opinion dated Jun. 22, 2011 for Corresponding PCT Application No. US2011/027158 filed Mar. 4, 2011.

International Preliminary Report of Patentability dated Jul. 19, 2012; for Corresponding PCT Application No. US2011/027158 filed Mar. 4, 2011.

* cited by examiner

WATER BASED PRIMER COMPOSITION FOR ISOCYANTE AND SILANE FUNCTIONAL ADHESIVES

CLAIM OF BENEFIT OF FILLING DATE

The present application is a national phase application of and claims the benefit of the PCT Application US2011/027158, filed Mar. 4, 2011 and Provisional Application 61/311,509, filed 8 Mar. 2010, the contents of which are hereby incorporated by reference in their entirety.

FIELD OF THE INVENTION

The present invention relates to a composition useful as an adhesion promoter for bonding adhesives containing prepolymers having isocyanate, silane or both functional groups to substrates. The present invention relates to processes for applying the composition of the invention to substrates, including processes wherein the composition of the invention is used to improve the adhesion of an adhesive containing prepolymers having isocyanate, silane or both functional groups to a substrate.

BACKGROUND

In many industrial adhesive bonding operations an adhesion promoter is applied to a surface to improve bonding of the adhesive to the surface of the substrate. Typical adhesion promoters are delivered dissolved, or dispersed, in an organic solvent. Organic solvents are used because many have low vapor pressures and volatilize away rapidly after application to the substrate. The solvent needs to be removed before application of the adhesive to facilitate bonding of the adhesive to the substrate. Organic solvents are also chosen because the adhesion promoting components typically can be dissolved or dispersed in an organic solvent. The use of organic solvents can result in their release into the environment. Alternatively, the use of organic solvents may require expensive ventilation and capturing equipment to reduce the risk of unacceptable human exposure or contamination of the environment.

For the abovementioned reasons there is considerable pressure to replace organic solvents in adhesion promoting systems with water. Adhesion promoters dissolved in or dispersed in water are known; see Gimvang United States Patent Publication 2009/0108231 and Braun et al. United States Patent Publication 2007/0187028. The use of water presents its own set of problems, including problems with solubility of the ingredients of the adhesion promoter in water and waters relatively high vapor pressure which can result in slow evaporation of water off of a substrate surface. This slow evaporation can slow down industrial processes. In many process the desire is to run the processes as fast as possible. Some of the known processes utilizing water based adhesion promoters require special dispensers, complex formulations or process conditions. Water based adhesion promoters can demonstrate poor wetting properties on certain surfaces:

What is needed is a composition which is not complex, avoids the use of organic solvents, can be applied using standard application processes and equipment, accommodate standard industrial processing speeds, wets surfaces well and is environmentally friendly. What is further needed are processes for using such compositions to promote adhesion of adhesives to surfaces.

SUMMARY OF THE INVENTION

The present invention relates to a composition comprising: a) from about 0.05 to about 10.0 parts by weight of a hydrosylate of one or more of alkoxysilyl amines; b) from about 0.05 to about 1.0 parts by weight of one of more alkoxylated alcohols, alkoxysilyl terminated alkoxylated alcohols, fatty acids or fatty acid esters or mixtures thereof; and, c) from about 80.0 to about 99.9 parts by weight of water; wherein the composition contains 100 parts by weight and the composition exhibits a pH of about 9 to about 12. In a preferred embodiment, the composition comprises a mixture of alkoxylated alcohols derived from seed oil. In a preferred embodiment organic based solvents are substantially absent from the composition.

In another embodiment the invention relates to a kit comprising a composition as described in the previous paragraph and an adhesive comprising a prepolymer containing isocyanate functional groups, silane groups or a mixture thereof.

In another embodiment the invention relates to a process comprising:
a) applying a composition as described hereinbefore, and h) wiping the applied composition off of the surface of the substrate, or allowing a major portion of the water in the composition to evaporate off of the surface of the substrate. In a preferred embodiment the process further comprises contacting the substrate, the first substrate, with an adhesive containing a prepolymer having isocyanate, silane or both functional groups and a second substrate wherein the adhesive is applied to the portion of the surface of the first substrate to which the composition was applied and the adhesive is disposed between the first and the second substrates. Preferably the process further comprises allowing the adhesive to cure.

It should be appreciated that the above referenced aspects and examples are non-limiting, as others exist within the present invention, as shown and described herein. The composition of the invention promotes adhesion of substrate surfaces to adhesives containing a prepolymer having isocyanate, alkoxy silyl or both functional groups. The use compositions of the invention result in bonds that are comparable to bonds formed when commercial adhesion promoters dissolved in organic solvents are used. The compositions of the invention exhibit excellent wetting characteristics on substrates and good water evaporation rates. The compositions of the invention provide evaporation and process rates comparable to those utilizing organic solvents. The compositions of the invention allow priming and processing of substrates in an efficient manner in the substantial absence of organic solvents.

DETAILED DESCRIPTION OF THE PREFERRED EMBODIMENT

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. Other combinations are also possible as will be gleaned from the following claims, which are also hereby incorporated by reference into this written description.

The present invention is directed to a unique solution for promoting adhesion of substrates to adhesives containing a prepolymer having isocyanate, silane or both functional groups. The solution comprises a composition comprising: a) from about 0.05 to about 10.0 parts by weight of a hydrosylate of one or more of alkoxysilyl amines; b) from about 0.05 to about 1.0 parts by weight of one of more alkoxylated alcohols, alkoxysilyl terminated alkoxylated alcohols, fatty acids or fatty acid esters; and, c) from about 80 to about 98.85 parts by weight of water: wherein the composition contains 100 parts by weight and the composition exhibits a pH of about 9 to about 12. Each of the components introduced above will be further detailed in the paragraphs below and in descriptions of illustrative examples/embodiments.

The solvent or dispersant used in composition of the invention is water. Preferably the water used is demineralized and deionized. Water is used in a sufficient amount to form a stable solution or dispersion of the other components. Stable as used herein means that the other components of the composition do not precipitate out of the solution or form a separate phase from the water. Preferably, the composition of the invention is stable for about 3 months or greater and more preferably for 12 months or greater. For use as an adhesion promoter the amount of water present is that amount which facilitates application and use of the composition as an adhesion promoter. Preferably water is present in the composition when ready for use and used in an amount of about 80.0 parts by weight or greater based on 100 parts of the composition, more preferably about 90.0 parts by weight or greater and most preferably about 95.0 parts by weight or greater. Preferably water is present in the composition when ready for use and used in an amount of about 99.9 pans by weight or less based on 100 parts of the composition, more preferably about 99.0 parts by weight or less and most preferably about 98.85 parts by weight or less. In order to reduce transportation cost, the composition of the invention can be prepared in the form of a concentrate that can be diluted to the concentrations described above for use. The substantial absence of organic solvents as used herein means that the composition referred to contains less than about 1 percent by weight of organic solvents and more preferably less than about 0.1 percent by weight of organic solvents.

The composition of the invention comprises a hydrosylate of one or more of alkoxysilyl amines. An alkoxy silyl amine is a compound that has one or more alkoxy silyl groups and one or more amines having at least one hydrocarbylene moiety disposed between the alkoxy silyl group and the amine group. Preferably the hydrocarbylene is alkylene or cycloalkylene and most preferably alkylene. Preferably the alkylene group is a $C_{1-4}$ alkylene group, with ethylene and propylene even more preferred and propylene most preferred. The amine can be primary or secondary and may have a hydrocarbyl group bonded to the amine nitrogen. Preferred hydrocarbyl groups on the amine nitrogen are $C_{1-20}$ hydrocarbyl groups, more preferably are $C_{1-20}$ alkyl groups, cyclohexyl and phenyl; more preferably $C_{1-4}$ alkyl groups and most preferably methyl or ethyl groups. Alkoxy silyl groups are groups having a silicon atom bonded to from one to three alkoxy groups, preferably two or three alkoxy groups and more preferably three alkoxy groups. The alkyl groups on the alkoxy moiety are preferably $C_{1-4}$ alkyl, more preferably ethyl or methyl and most preferably methyl. The alkoxy silyl groups may have 1 or 2 alkyl groups bonded to the silicon atom. The alkyl groups bonded to the silicon atom are preferably $C_{1-4}$ alkyl, more preferably ethyl or methyl and most preferably methyl. Hydrolysate as used herein means that a significant portion of the alkoxy groups have been hydrolyzed and removed from recited amines. Without wishing to be bound by this theory it is believed that the hydrolyzed alkoxy silyl amines preferably have most of the alkoxy groups removed and most preferably substantially all of them removed. "Most of" in this context means that greater than 50 mole percent of the alkoxy groups are hydrolyzed away, more preferably greater than 75 mole percent and most preferably greater than 90 mole percent, based on the total alkoxysislyl amines added to the hydrolysis mixture. "Substantially all" in this context means that greater than 95 mole percent of the alkoxy groups are hydrolyzed away and most preferably greater than 99 mole percent, based on the total alkoxysilyl amines added to the hydrolysis mixture. In the hydrolysis process oligomers of the remaining silyl amines may form. In the process for preparing the hydrolyzed alkoxysilyl amines, the alcohols, formed as a result of the hydrolysis of the alkoxy groups, are removed from the reaction mixture. Preferred alkoxysilyl amines include alkoxysilyl hydrocarbyl amines, alkoxysilyl polyhydrocarbylamines and bis(alkoxysilyl)hydrocarhyl amines. Alkoxysilyl amines comprise a siloxy alkyl group bonded to a hydrocarbylene group which is further bonded to an amine which may optionally have a hydrocarbyl group bonded thereto. Preferably the alkoxysilyl hydrocarbyl amines are alkoxysilyl alkyl amines which correspond to the formula;

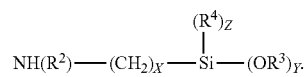

Alkoxysilyl polyhydrocarbylamines are compounds comprising one or more alkoxysilyl groups bonded to a hydrocarbylene group and further bonded to the hydrocarbylene group is a polyalkylpolyamine chain wherein the terminal amine of the polyalkylpolyamine chain may optionally be substituted with a hydrocarhyl group. Alkoxysilyl polyhydrocarbylamines preferably comprise alkoxysilyl polyalkylamines. Preferred alkoxysilyl polyalkylamines correspond to the formula;

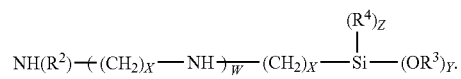

Bis(alkoxysilyl)hydrocarhyl amines comprise two hydrocarbylene alkoxysilyl groups bonded to a the nitrogen of a secondary amine. Preferred bis(alkoxysilyl)hydrocarbyl amines are bis(alkoxysilyl) amines. Preferred bis(alkoxysilyl) amines correspond to the formula;

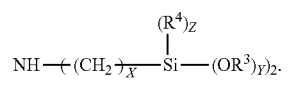

In the formulas provided hereinbefore; $R^2$ is separately in each occurrence a $C_{1-20}$ hydrocarbyl group; $R^3$ is separately in each occurrence a $C_{I4}$ alkyl group; $R^4$ is separately in each occurrence a $C_{1-4}$ alkyl group; w is separately in each occurrence an integer of from about 1 to about 10; x is separately in each occurrence an integer of from 1; to y is separately in each occurrence an integer of from 1 to 3; and z is separately in each occurrence an integer of from 0 to 2 provided that z=3−y. In the above formulas, after hydrolysis some or all of $R^3$ may be hydrogen.

$R^2$ is preferably a $C_{1-20}$ alkyl, cyclohexyl or phenyl group, more preferably a $C_{1-4}$ alkyl group and most preferably methyl or ethyl groups. $R^3$ is preferably ethyl or methyl and most preferably methyl. $R^4$ is preferably $C_{1-4}$ alkyl, more preferably ethyl or methyl and most preferably methyl. Preferably x is 2 or 3 and most preferably 3. Preferably, w is about 1 to about 4, more preferably about 1 to about 2 and most preferably about 1. Preferably, y is 2 or 3 and most preferably 3. Preferably z is 0 or 1 and most preferably 0.

Among preferred alkoxysilyl alkylamines are 3-aminopropyltrimethoxysilane, 3-aminopropyl-dimethoxymethylsilane, 3-amino-2-methylpropyltrimethoxysilane, 4-aminobutyl-trimethoxysilane, 4-aminobutyldimethoxymethylsilane, 4-amino-3-methylbutyl-trimethoxysilane, 4-amino-3,3-dimethylbutyltrimethoxysilane, 4-amino-3,3-di-methylbutyldimethoxymethylsilane, 2-aminoethyltrimethoxysilane, 2-amino-ethyldimethoxymethylsilane, aminomethyltrimethoxysilane, aminomethyldimethoxymethylsilane, aminomethylmethoxydimethylsilane, N-methyl-3-aminopropyltrimethoxysilane, N-ethyl-3-aminopropyltrimethoxysilane, N-butyl-3-aminopropyltrimethoxysilane, N-cyclohexyl-3-aminopropyltrimethoxysilane, N-phenyl-3-aminopropyltrimethoxysilane, N-methyl-3-amino-2-methylpropyltrimethoxysilane, N-ethyl-3-amino-2-methylpropyltrimethoxysilane, N-ethyl-3-aminopropyldimethoxymethylsilane, N-phenyl-4-aminobutyltrimethoxysilane, N-phenylaminomethyldimethoxymethylsilane, N-cyclohexylaminomethyldimethoxymethylsilane, N-methylaminomethyldimethoxymethylsilane, N-ethyl-aminomethyldimethoxymethylsilane, N-propylaminomethyldimethoxymethyl-silane, N-butylaminomethyldimethoxymethylsilane and mixtures thereof. Among preferred alkoxysilyl polyalkylamines are N-(2-aminoethyl)-3-aminopropyltrimethoxysilane and 3-[2-(2-aminoethylamino)ethylamino]propyltrimethoxysilane. Among preferred bis(alkoxysilyl) alkyl amines is bis(trimethoxysilylpropyl)amine.

The hydrolzed alkoxysilyl amines are prepared by the process disclosed in Standke U.S. Pat. No. 6,534,667 incorporated herein by reference. In general, the process is carried out by hydrolyzing alkoxysilyl amines and removing the resulting hydrolysis alcohols by distillation. Mixing of the alkoxysilyl amines with water can be carried out in a temperature range between the solidifying point and boiling point of the alkoxysilyl amines employed. Generally, water is added in excess to the alkoxysilyl amines for carrying out the hydrolysis. The concentration of the silanes in the aqueous solution is suitably adjusted to a value of less than about 60 percent by weight, preferably about 0.5 to about 40 percent by weight. Deviation from these parameters can cause gel formation or severe clouding. Alcohol is formed on hydrolysis the alkoxysilyl amines. In general, the hydrolysis can be carried out at a temperature in the range from about 0 to about 100° C. Generally, thorough mixing is utilized, for example by stirring. The hydrolysis is suitably carried out at a pH in the range from about 4 to about 12. An acid or base can be added to the silane mixture or silane mixture/water system or the already hydrolyzed system to establish the pH. Preferably, at least one Brönsted acid is added in the process according to the invention. If necessary, a Brönsted base can also be added, for example potassium hydroxide solution, sodium hydroxide solution and ammonia or amines, to name only a few. Hydrochloric acid, sulfuric acid, nitric acid, perchloric acid, formic acid, acetic acid and/or propionic acid are particularly preferred as the acid. In the process, the concentration of hydrolysis alcohol is furthermore lowered by distillation, the distillation preferably being carried out at a temperature of less than about 90° C., particularly preferably at less than about 60° C., and suitably under reduced pressure. The distillation can advantageously be carried out via a distillation column and can be continued until no further alcohol can be detected at the top of the column, the desired product, which can optionally be worked up further, being obtained at the bottom. If clouding substances should occur, these can be removed from the product by means of filtration, sedimentation, centrifugation or similar standard processes.

The hydrolyzed alkoxysilyl amines are present in the composition in a sufficient amount to enhance the adhesion of a substrate to an adhesive wherein the composition is stable as described in this application. Preferably the hydrolyzed alkoxysilyl amines are present in an amount of about 0.05 parts by weight or greater based on the weight of the composition and more preferably about 0.5 parts by weight or greater. Preferably the hydrolyzed alkoxysilyl amines are present in an amount of about 10.0 parts by weight or less based on the weight of the composition and more preferably about 5.0 parts by weight and most preferably about 3.0 parts by weight or less.

The composition of the invention further contains of one of more alkoxylated alcohols, alkoxysilyl terminated alkoxylated alcohols, fatty acids or fatty acid esters or mixtures thereof. The one of more alkoxylated alcohols, alkoxysilyl terminated alkoxylated alcohols, fatty acids or fatty acid esters or mixtures thereof improve the wettablility of the composition on a substrate surface. Fatty acids are carboxylic acids having a long aliphatic chain attached to the carboxylic acid. The aliphatic chain preferably has from 2 to 26 carbon atoms. The aliphatic chain can be fully saturated or contain one or more double bonds. An aliphatic chain having one double bond is monounsaturated and an aliphatic chain having more than one double bond is polyunsaturated. Examples of fatty acids include acetic acid, butyric acid, palmitic acids, linoleic acid, linolenic acid, arachidonic acid, oleic acid, butyric acid, valeric acid, caproic acid, caprylic acid, 2-ethylhexanoic acid, capric acid, lauric acid, myristic acid, palmitoleic acid, stearic acid, isostearic acid, elaidic acid, petroselic acid, elaeostearic acid, conjuene fatty acid, ricinoleic acid, arachic acid, gadoleic acid, behenic acid, erucic acid and brassylic acid. Fatty acids are typically found in plant and animal lipids (fat), such as glycerides, sterols, and phospholipids. A fatty acid ester is the reaction product of a fatty acid and an alcohol. Preferably the alcohol has from about 1 to about 14 carbon atoms and preferably has only one hydroxyl group. Preferred fatty acids as used herein correspond to the formula

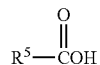

wherein $R^5$ is separately in each occurrence a $C_{2-26}$ aliphatic chain. Preferred fatty acid esters correspond to the formula

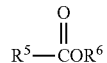

wherein $R^5$ is as described hereinbefore and $R^6$ is a $C_{1-14}$ aliphatic chain.

The one of more alkoxylated alcohols comprise one or more alcohols having a chain of alkylene oxide groups bonded thereto. The starting alcohol can contain one or more hydroxyl groups, preferably 1 to 6, more preferably 1 to 3 and most preferably 1. The starting alcohols can have from 1 to about 20 carbon atoms and preferably have from 1 to 16 carbon atoms, and most preferably 6 to 16 carbon atoms. In one embodiment the starting alcohols comprise a mixture. In a more preferred embodiment the alcohols are a mixture derived from a natural source, such as a seed oil. The alcohols are alkoxylated by replacing the hydroxyl group with one or more chains of one or more alkylene oxide groups. Generally any known alkylene oxides may be reacted with the alcohol to form the alkylene oxide chain. Among preferred alkylene oxides are ethylene oxide, propylene oxide, butylene oxide and the like. More preferred are ethylene oxide and propylene oxide. The alkylene oxide chains may comprise one or more than one alkylene oxide. Where two or more alkylene oxides are used they may be arranged in blocks or randomly. More preferred alkylene oxide chains include propylene oxide and ethylene oxide. In an even more preferred embodiment, the chain comprises a propylene oxide block bonded to the residue of the alcohol and an ethylene oxide block bonded to the propylene oxide block. The preparation of alkoxylated alcohols is described in U.S. Pat. No. 5,844,115; and WO 2008/088647 (U.S. Ser. No. 12/521,827) incorporated herein by reference. Preferred alkoxylated alcohols are alkoxylated seed oil alcohols including those described in WO 2008/088647 (U.S. Ser. No. 12/521,827) incorporated herein by reference. Preferred alkoxylated alcohols are described by the formula

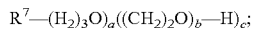

wherein:

$R^7$ is separately in each occurrence a $C_{1-20}$ straight or branched chain alkyl or alkenyl group:

a is separately in each occurrence is an integer of about 1 to about 3;

b is separately in each occurrence an integer of about 2 to about 10; and, c is separately in each occurrence 1 to 6, more preferably 1 to 3 and most preferably 1. Preferably, $R^7$ is a mixture of seed-oil based linear alkyl moieties with an alkyl moiety distribution as follows wherein each weight percent is based upon weight of all alkyl moieties present in the distribution and all weight percent for each distribution total 100 weight percent: Carbon Atoms in Moiety Amount; $C_6$ 0 wt %-40 wt %, $C_8$ 20 wt %-40 wt %; $C_{10}$ 20 wt %-45 wt %; $C_{12}$ 10 wt %-45 wt %; $C_{14}$ 0 wt %-40 wt %; and $C_{16}$-$C_{18}$ 0 wt %-15 wt %.

The one of more alkoxysilyl terminated alkoxylated alcohols comprise one or more alcohols having a chain of alkylene oxide groups bonded thereto which are terminated with alkoxysilyl groups. The alkoxysilyl groups are described hereinbefore. All or a portion of the hydroxyl groups of the alkoxylated alcohols may be replaced with alkoxysilyl groups, preferably all. In a preferred embodiment the alkoxysilyl terminated alkoxylated alcohols correspond to the formula:

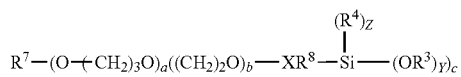

and more preferably

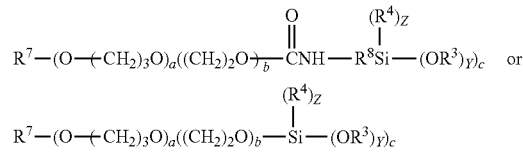

wherein $R^3$, $R^4$, $R^7$, a, b, c and y are as described hereinbefore, $R^8$ is a $C_{1-20}$ hydrocarbylene group and X is a direct link or linking group formed by the reaction of alkoxylated alcohols with an alkoxy silane having a group reactive with a hydroxyl compound. X is preferably a direct link or —C(O)NH. f is separately in each occurrence 0 or 1. $R^8$ is preferably a $C_{1-4}$ alkylene group, even more preferably ethylene or propylene and most preferably a propylene group. The one of more alkoxysilyl terminated alkoxylated alcohols may be prepared by reacting one or more alkoxylated alcohols with an alkoxy silane having a group reactive with a hydroxyl compound, for instance an isocyanate group or silanol group. In the embodiment wherein not all of the hydroxyl groups are converted to alkoxysilyl groups the surfactant may comprise mixture of one of more alkoxylated alcohols and one or more alkoxysilyl terminated alkoxylated alcohols, which may be represented in preferred embodiments by the formulas provided hereinbefore. Where c is greater than 1 compounds with both terminal hydroxyl and alkoxysilyl groups can be prepared. These compounds can be illustrated by the formula

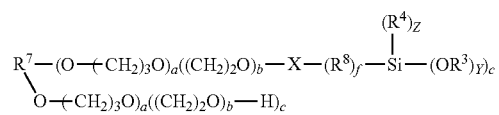

wherein d and e are separately in each occurrence 1 to 5, preferably 1 to 2 and most preferably 1.

The one of more alkoxylated alcohols, alkoxysilyl terminated alkoxylated alcohols, fatty acids or fatty acid esters or mixtures thereof are present in sufficient amount to improve the wetting characteristics of the composition of the invention on the surface of substrates. Preferably, the one of more alkoxylated alcohols, alkoxysilyl terminated alkoxylated alcohols, fatty acids or fatty acid esters or mixtures thereof are present in an amount of about 0.05 parts by weight or greater based on the weight of the composition and more preferably about 0.08 parts by weight or greater. Preferably, the one of more alkoxylated alcohols, alkoxysilyl terminated alkoxylated alcohols, fatty acids or fatty acid esters or mixtures thereof are present in an amount of about 1.0 parts by weight or less based on the weight of the composition and more preferably about 0.12 parts by weight or less. In order to reduce transportation cost, the composition of the invention can be prepared in the form of a concentrate that can be diluted to the concentrations described above for use. The upper limit on the concentration of the one of more alkoxylated alcohols, alkoxysilyl terminated alkoxylated alcohols, fatty acids or fatty acid esters or mixtures thereof in a concentrate is based on the concentration above which the concentrate no longer is stable.

The composition of the invention may further contain a component that fluoresces when illuminated by ultraviolet light. Fluorescing components are readily available from numerous sources, for example Aldrich Chemical Co., Milwaukee, Wis. As a specific example, the fluorescing component can be Uvitex OB brand fluorescing agent available from Ciba Specialty Chemicals, Tarrytown, N.Y. (USA). The amount of fluorescing agent added to the composition must be sufficient so that the area of the window treated with the composition is apparent when the window is illuminated with an ultraviolet light.

The composition of the invention may contain a high molecular weight resin. The high molecular weight resins are present for the purpose of forming a film which provides strength to the composition and/or protects the substrate from environmental attack. Any high molecular weight resin which forms a film upon evaporation of water may be used. The high molecular weight resin can have functional groups which react into the adhesive system or which react with the surface of the substrate. Alternatively, reactive functional groups are not required for the high molecular weight resin to work in the compositions. Examples of useful functional groups are hydroxyl, carboxyl, isocyanato, alkoxysilane, mercaptosilane, epoxy functional groups; mixtures thereof and the like. Preferred functional groups are hydroxyl, carboxyl, isocyanato, alkoxysilane, isocyanato and mixtures thereof. More preferred functional groups are isocyanato and alkoxysilane. Preferred alkoxysilanes are di- or tri-methoxy silanes. Preferred classes of resins are acrylics, isocyanate functional prepolymers, alkoxysilane resins, polyesters and the like. Preferred classes of resins are acrylics, isocyanate functional prepolymers and alkoxysilane based resins. More preferred resins are Vestoplast® 206 silanated amorphous polyolefins available from Degussa, SAX 400 and SAT 200 silyl functional polypropylene oxide based polymers available from Kaneka and silane terminated polyurethanes. The resins preferably have a molecular weight which facilitates the formation of a strong film upon evaporation of the solvent. Preferably the high molecular weight resins have an weight average molecular weight of about 5,000 or greater, more preferably about 10,000 or greater and most preferably about 15,000 or greater. Preferably the high molecular weight resins have a weight average molecular weight of about 200,000 or less, more preferably about 150,000 or less and most preferably about 100,000 or less.

The composition of the invention may further comprise a stabilizing amount of an organophosphite. The organophosphite is preferably present in a sufficient amount to enhance the durability of bond of the adhesive composition to the substrate surface. Preferably at least one of the phosphorous atoms is bonded to an oxygen atom which is bonded to an aromatic moiety, such as a phenyl. Preferably at least one of the phosphorous atoms is bonded to an oxygen atom bonded to an alkyl moiety. Preferably at least one of the phosphorous atoms is bonded to both an aromatic moiety and an alkyl moiety through oxygen moieties. The organophosphites preferred for use in this invention are phosphites wherein the ligands on the phosphite comprise one ligand with at least one aliphatic moiety and one ligand with at least one aromatic moiety or comprises at least one ligand having both aromatic and aliphatic structure; i.e. alkaryl. Ligand as used in this context refers to the groups bound to the oxygens bound to the phosphorous atoms of the phosphite. In a preferred embodiment the phosphite corresponds to the formula

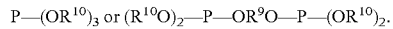
P—(OR$^{10}$)$_3$ or (R$^{10}$O)$_2$—P—OR$^9$O—P—(OR$^{10}$)$_2$.

Preferably R$^{10}$ is independently in each occurrence C$_{6-48}$ alkyl, C$_{7-30}$ alkaryl or C$_{6-20}$ aryl; more preferably C$_{6-12}$ alkyl and most preferably C$_{9-12}$ alkyl. Preferably R$^9$ is independently in each occurrence C$_{6-18}$ alkylene, C$_{7-30}$ alkarylene, or C$_{6-20}$ arylene; more preferably C$_{7-30}$ alkarylene, or C$_{6-20}$ arylene: even more preferably C$_{7-30}$ alkarylene and most preferably a divalent bisphenol structure, for instance 1,3 propylene diphenyl or methylene diphenyl. Preferably the divalent bisphenol is based on bisphenol A or bisphenol F. As used herein alkyl means saturated straight or branched carbon chain. Among preferred organophosphites are poly(dipropyleneglycol) phenyl phosphite (available from Dover Chemical Corporation under the trademark and designation DOVERPHOS 12), tetrakis isodecyl 4,4' isopropylidene diphosphite (available from Dover Chemical Corporation under the trademark and designation DOVERPHOS 675), and phenyl diisodecyl phosphite (available from Dover Chemical Corporation under the trademark and designation DOVERPHOS 7). Preferably, the organophosphite is present in the composition of the invention in an amount of about 0.1 parts by weight or greater and more preferably about 0.2 parts by weight or greater based on the weight of the composition of the invention. Preferably the organophosphite is present in the composition of the invention in an amount of about 1.0 parts by weight or less and more preferably about 0.5 parts by weight or less based on the weight of the composition of the invention.

In a preferred embodiment, the composition of the invention may further include a light stabilizer. Any light stabilizer which facilitates the system maintaining durable bond to the substrate for a significant portion of the life of the structure to which it is bonded may be used. Preferred light stabilizers are hindered amine light stabilizers. Hindered amine light stabilizers generally comprise include those available from Ciba Geigy such as Tinuvin 144, n-butyl-(3,5-di-ter-butyl-4-hydroxybenzyl)bis-(1,2,2,6-penta methyl-4-piperidinyl) malonate; Tinuvin 622, dimethyl succinate polymer with 4-hydroxy-2,2,6,6,-tetramethyl-1-piperidine ethanol; Tinuvin 77, bis(2,2,6,6,-tetramethyl-4-piperidinyl) sebacate; Tinuvin 123, bis-(1-octyloxy-2,2,6,6, tetramethyl-4-piperidinyl) sebacate, Tinuvin 765, bis(1,2,2,6,6,-pentamethyl-4-piperidinyl) sebacate; Chimassorb 944 poly[[6-[1,1,3,3-tetramethyl-butyl)amino]-1,3,5-triazine-2,4-diyl][(2,2,6,6-tetramethyl-4-piperidinyl)imino]-1,6-hexaned iyl[(2,2,6-tetramethyl-4-piperidinyl)imino]]) and available from Cytec Cyasorb UV-500 1,5-dioxaspiro (5,5) undecane 3,3-dicarboxylic acid, bis(2,2,6,6,-tetramethyl-4-piperidinyl) ester; Cyasorb UV-3581, 3-dodecyl-1-(2,2,6,6,-tetramethyl-4-piperidyl-pyrrolidin-2,5-dione) and Cyasorb UV-3346, poly[(6-morpholino-s-triazine-2,4-diyl) [2,2,6,6-tetramethyl-4-piperidyl)imino]-hexamethylene [(2,2,6,6-tetramethyl-4-piperidyl) imino]]. More preferred hindered light amine stabilizers include Tinuvin 1,2,3 bis-(1-octyloxy-2,2,6,6, tetramethyl-4-piperidinyl) sebacate and Tinuvin 765, bis(1,2,2,6,6,-pentamethyl-4-piperidinyl) sebacate. A sufficient amount of light stabilizer to enhance the bond durability to the substrate may be used. Preferably, the light stabilizer is used in amount of about 0.1 parts by weight or greater, based on the weight of the composition of the invention, more preferably 0.2 parts by weight or greater and most preferably about 0.3 parts by weight or greater based on the weight of the composition of the invention. Preferably, the amount of light stabilizer present is about 3 weight parts or less, based on the weight of the composition of the invention, more preferably about 2 weight parts or less and most preferably about 1 weight parts or less based on the weight of the composition of the invention.

In another preferred embodiment, the composition of the invention may further comprise an ultraviolet light absorber. Any ultraviolet absorber which enhances the durability of the bond of the adhesive to the substrate may be used. Preferred UV light absorbers include benzophenones and benzotriazoles. More preferred UV light absorbers include those from Ciba Geigy such as Tinuvin P, 2-(2'-hydroxy-5'-methylphenyl)-benzotriazole; Tinuvin 326, 2-(5-chloro-2H-benzotriazol-2-yl)-6-(1,1-dimethylethyl)-4-methylphenol; Tinuvin 213 poly(oxy-1,2-ethanediyl), (α,(3-(3-(2H-benzotriazol-2-yl)-5-(1,1-dimethylethyl)-4-hydroxyphenyl)-1-oxopropyl)-ω-hydroxy; poly(oxy-1,2-ethyanediyl), (α,(3-(3-(AH-benzotriazol-2-yl)-5-(1,1-dimethylethyl)-4-hydroxyphenyl)-1-oxopropyl)-ω)-(α,(3-(3-(2H-benzotriazol-2-yl)-5-(1,1-dimethylethyl)-4-hydroxyphenyl)-1-oxopropyl); Tinuvin 327, 2-(3,5-di-tert-butyl-2-hydroxyphenol)-5-chlorobenzotriazole; Tinuvin 571, 2-(2H-benzotriazol-2-yl)-6-dodecyl-4-methylphenol, branched and linear; Tinuvin 328, 2-(2H-benzotriazol-2-yl)-4,6-bis(1,1-dimethylpropyl)phenol and from Cytec such as Cyasorb UV-9,2-hydroxy-4-methoxybenzophenone; Cyasorb UV-24, 2,2'-dihydroxy-4-methoxybenzophenone; Cyasorb UV-1164, [4,6-bis(2,4-dimethylphenyl)-1,3,5-triazin-2-yl]-5-(octyloxy) phenol; Cyasorb UV-2337, 2-(2'-hydroxy-3'-5'-di-t-amylphenyl)benzotriazole; Cyasorb UV-2908, 3,5-di-t-butyl-4-hydroxyhenzoic acid, hexadecyl ester; Cyasorb UV-5337, 2-(2'-hydroxy-3',5'-di-t-butylphenyl)-5-chlorobenzotriazole; Cyasorb UV-531, 2-hydroxy-4-n-octoxybenzophenone; and Cyasorb UV-3638, 2,2-(1,4-phenylene)bis[4H-3,1-benzoxazin-4-one]. More preferred UV light absorbers include Cyasorb UV-531, 2-hydroxy-4-n-octoxybenzophenone and Tinuvin 571 2-(2H-benzotriazol-2-yl)-6-dodecyl-4-methylphenol, branched and linear. Preferably, the UV light absorber is used in sufficient amount to enhance the durability of the bond of the adhesive to the substrate. Preferably, the UV absorber is used in an amount of about 0.1 parts by weight or greater, based on the weight of the composition of the invention, more preferably about 0.2 weight parts or greater and most preferably about 0.3 weight parts or greater based on the weight of the composition of the invention. Preferably, the UV light inhibitor is used in amount of about 3 parts by weight or less based on the weight of the composition of the invention, more preferably about 2 parts by weight or less and most preferably about 1 parts by weight or less based on the weight of the composition of the invention.

The components of the composition of the invention are blended in water under conditions such that a stable homogeneous composition is formed. The composition may be prepared to have concentrations of components for final application as described hereinbefore. Stable as used herein with respect to the composition of the invention means that the components remain in solution for a period of three months or greater when stored at ambient temperatures, from 20 to 30° C., and more preferably for a period of 6 months, and most preferably for a period of 12 months. This is also known in the art as the shelf life of the composition.

In one embodiment, the invention is a kit which comprises the composition of the invention described hereinbefore and an adhesive comprising a prepolymer containing isocyanate functional groups, silane (siloxy) groups or a mixture thereof. The adhesive can be any known adhesive bead useful in bonding windows into structures. Preferably, the adhesive comprises a prepolymer containing isocyanate functional groups and the prepolymer further contains silane functional groups or the adhesive further contains a silane functional group containing compound. The system of the invention can utilize any isocyanate functional adhesive which is designed for bonding to non-porous surfaces such as metal, coated plastic and/or glass. Examples of useful adhesive systems are disclosed in U.S. Pat. No. 4,374,237, U.S. Pat. No. 4,687,533, U.S. Pat. No. 4,780,520, U.S. Pat. No. 5,063,269, U.S. Pat. No. 5,623,044, U.S. Pat. No. 5,603,798, U.S. Pat. No. 5,852, 137, U.S. Pat. No. 5,976,305, U.S. Pat. No. 5,852,137, U.S. Pat. No. 6,512,033, relevant portions incorporated herein by reference. Examples of commercial adhesives which may be used herein are BETASEAL™ 15630, 15625, 61355, 1910, 1925, 1945, 1900 adhesives available from The Dow Chemical Company. EFBOND™ windshield adhesives available from Eftec, WS 151™, WS212™ adhesives available from Yokohama Rubber Company, and SIKAFLEX™ adhesives available from Sika Corporation.

The polyisocyanate functional adhesives useful in the invention generally comprise a prepolymer having isocyanate functionality, a catalyst for the cure of the prepolymer and other additives well known to those skilled in the art. The prepolymers used in the invention can be conventional prepolymers used in isocyanate functional adhesive compositions. In a preferred embodiment the prepolymers are blended with a compound or polymer having alkoxy silane functionality. In another preferred embodiment, the prepolymer contains alkoxy silane functionality as well as isocyanate functionality. A prepolymer having alkoxy silane functionality may be used as the entire prepolymer used in the adhesive or it may be blended with a prepolymer which does not have alkoxy silane functionality. The isocyanate functional prepolymer is present in the adhesive composition in sufficient amount such that the adhesive is capable of bonding glass or coated plastic to the desired substrate such as metal, plastic, fiberglass or composites. Preferably, the isocyanate functional prepolymer is present in an amount of about 20 parts by weight or greater based on the weight of the adhesive composition, more preferably about 30 parts by weight or greater and most preferably about 40 parts by weight or greater. Preferably, the isocyanate functional prepolymer is present in an amount of about 99.8 parts by weight or less based on the weight of the adhesive composition, more preferably about 98 parts by weight or less and most preferably about 85 parts by weight or less.

In many embodiments it is desirable to have a silane present in some form. Preferable methods of including silane functionality in the adhesive formulations are disclosed in Wu et al., U.S. Pat. No. 6,512,033 at column 5, line 38 to column 7, line 27; Chaio, U.S. Pat. No. 5,623,044; Berger et al., U.S. Pat. No. 4,374,237; Rizk et al., U.S. Pat. No. 4,345,053 and Rizk et al., U.S. Pat. No. 4,625,012, relevant portions incorporated herein by reference. The amount of silane present is that amount which enhances the adhesion of the adhesive to the substrate surface. The amount of silane present is preferably about 0.1 parts by weight or greater based on the weight of the adhesive and most preferably about 0.5 parts by weight or greater. The amount of silane used is preferably about 10 parts by weight or less and most preferably about 2.0 parts by weight or less. The adhesive also contains a catalyst which catalyzes the reaction of isocyanate moieties with water or an active hydrogen containing compound. The catalyst can be any catalyst known to the skilled artisan for the reaction of isocyanate moieties with water or active hydrogen containing compounds. Among preferred catalysts are organotin compounds, metal alkanoates, and tertiary amines, such as dimorpholinodialkyl ethers. The organotin catalyst is present in an amount of about 1.0 part by weight or less based on the weight of the adhesive, more preferably about 0.5 parts by weight or less and most preferably about 0.1 parts by weight or less. Tertiary amines are preferably employed in an amount, based on the weight of the adhesive, of about 0.01 parts by weight or greater based on the adhesive, more preferably about 0.05 parts by weight or greater, even more preferably about 0.1 parts by weight or greater and most preferably about 0.2 parts by weight or greater and about 2.0 parts by weight or less, more preferably about 1.75 parts by weight or less, even more preferably about 1.0 parts by weight or less and most preferably about 0.4 parts by weight or less. The adhesive composition may further comprise a stabilizing amount of an organophosphite as described hereinbefore.

In one embodiment, the adhesive composition useful in the invention contains a polymer having a flexible backbone and having silane moieties capable of silanol condensation. The polymer with a flexible backbone can be any polymer with a flexible backbone which can be functionalized with a silane capable of silanol condensation. Among preferred polymer backbones are polyethers, polyurethanes, polyolefins and the like. Among more preferred polymer backbones are the polyethers and polyurethanes, with the most preferred being the polyethers. Examples of such adhesive compositions are those disclosed in Mahdi, 2002/100550 A1. Even more preferably the polymer is a polyether having silane (siloxy) moieties capable of silanol condensation. In some embodiments, the polymers useful in the invention are polymers as disclosed in Yukimoto et al., U.S. Pat. No. 4,906,707; Iwakiri et al., U.S. Pat. No. 5,342,914; Yukimoto, U.S. Pat. No. 5,063,270; Yukimoto et al., U.S. Pat. No. 5,011,900; or Suzuki et al., U.S. Pat. No. 5,650,467, all incorporated herein by reference. More preferably such polymers are oxyalkylene polymers containing at least one reactive silicon group per molecule. The terminology "reactive silicon group" or "reactive silane capable of silanol condensation" means a silicon-containing group in which a hydrolyzable group or a hydroxyl group is bonded to the silicon atom and which is cross-linkable through silanol condensation reaction. The hydrolyzable group is not particularly limited and is selected from conventional hydrolyzable groups. In one embodiment, the flexible polymer used in the adhesive composition is a silyl terminated prepolymer prepared by contacting a polyol as described herein with an isocyanato silane having at least one silane moiety which has bonded thereto a hydrolyzable moiety under conditions such that the hydroxyl moieties of the polyol react with the isocyanate moieties of the isocyanatosilane so as to place a terminal silane moiety on the polyol, preferably the contacting is performed without addition of catalyst. In another embodiment, the polymer may be a polyurethane based backbone having hydrolyzable silane groups. Such materials are disclosed in Chang, U.S. Pat. No. 4,622,369 and Pohl, U.S. Pat. No. 4,645,816, relevant portions incorporated herein by reference. In another embodiment, the backbone can be a flexible polymer such as a polyether or polyolefin, having silicon moieties having bound thereto. A flexible polymer with unsaturation can be reacted with a compound having a hydrogen or hydroxyl moiety bound to silicon wherein the silicon moiety also has one or more carbon chains with unsaturation. The silicon compound can be added to the polymer at the point of unsaturation by a hydrosilylation reaction. This reaction is described in Kawakuho, U.S. Pat. No. 4,788,254, column 12, lines 38 to 61; Isayama et al., U.S. Pat. No. 3,971,751; Iwakiri et al., U.S. Pat. No. 5,223,597; Hirose et al., U.S. Pat. No. 4,923,927; Iwahara et al., U.S. Pat. No. 5,409,995 and Iwahara et al., U.S. Pat. No. 5,567,833, incorporated herein by reference. The polymer prepared can be crosslinked in the presence of a hydrosilylation crosslinking agent and hydrosilylation catalyst as described in U.S. Pat. No. 5,567,833 at column 17, lines 31 to 57, and Iwahara et al., U.S. Pat. No. 5,409,995, incorporated herein by reference. The prepolymer is present in the adhesive composition in a sufficient amount such that the adhesive is capable of bonding glass or coated plastic to another substrate, such as metal, plastic, a composite or fiberglass. Preferably, the prepolymer is present in an amount of about 30 percent by weight or greater based on the weight of the adhesive, more preferably about 40 percent by weight or greater, even more preferably about 45 percent by weight or greater and most preferably about 50 percent by weight or greater. More preferably, the prepolymer is present in an amount of about 99.8 percent by weight or less based on the weight of the adhesive and most preferably about 85 percent by weight or less. The adhesive composition containing alkoxy silane functional groups further comprises one or more catalysts known to one skilled in the art which catalyzes the silanol condensation reaction. Preferred catalysts are tin catalysts which are well known in the art, see Mahdi et al., U.S. 2002/0100550 (U.S. Pat. No. 6,828,403), paragraph incorporated herein by reference. The amount of catalyst in the adhesive formulation is preferably about 0.01 parts by weight or greater, more preferably about 0.1 parts by weight or greater, and most preferably about 0.2 parts by weight or greater, and preferably about 5 parts by weight or less, even more preferably about 1.0 parts by weight or less, even more preferably 0.5 parts by weight or less and most preferably about 0.4 parts by weight or less based on 100 parts by weight of the composition of the invention. The silane containing adhesive may further comprise additives known to one skilled in the art including those described hereinbefore with respect to isocyanate prepolymer based adhesive compositions.

In another embodiment the invention is a process comprising: a) applying a composition according to the invention to a surface of a substrate; and b) wiping the applied composition off of the surface of the substrate or allowing a major portion of the water in the composition to evaporate off of the surface of the substrate. The composition of the invention may be applied by any means well known in the art. It may be applied manually by spraying, brushing, rolling or applying an absorbent material, such as a cloth, containing the composition to the surface of a substrate to which the adhesive will be applied such that a sufficient amount of the composition is applied to the surface. The composition can be applied by hand using an absorbent material such as a felt or sponge applicator, a primer stick or by robotic application, utilizing machines such as automated felt applicator as, e.g., provided by Nordson Deutschland GmbH, Erkrath, Germany, automated spray application equipment as e.g., provided by SCA Schucker GmbH, Bretten-Golshausen, Germany or the M710I robotic system available from Fanuc Robotics America of Rochester Hills, Mich. used with an automated primer dispense applicator supplied by Nordson Corporation, Amherst, Ohio. In one embodiment, the composition of the invention is applied and the water is allowed to evaporate away from the surface of the substrate. In another embodiment, an absorbent material, such as described hereinbefore, is wiped over the substrate to which the composition of the invention was applied. Preferably the composition is applied and the water is allowed to evaporate off, that is no wipe off step is utilized. Generally, this results in removal of the water and leaves some of the hydrolyzed alkoxysilyl amine and the one of more alkoxylated alcohols, fatty acids or fatty acid esters on the surface of the substrate. The process of the invention may further comprise contacting a first substrate with an adhesive containing a prepolymer having isocyanate, silane or both functional groups and a second substrate wherein the adhesive is applied to the portion of the surface of the first substrate to which the composition was applied and the adhesive is disposed between the first and the second substrates. In the embodiment wherein water is allowed to evaporate away, the adhesive can be applied after sufficient time such that the adhesive durably bonds to the surface of the substrate. Preferably the flash time, that is the time the water is allowed to evaporate away, is at least about 60 seconds, more preferably at least about 20 seconds, and most preferably at least about 10 seconds. In a preferred embodiment, the composition of the invention preferably enhances adhesion after application and before adhesive application for 30 days or less, more preferably 7 days or less, more preferably 3 days or less and even more preferably 60 minutes or less.

The system of the invention is used to bond porous and nonporous substrates together. The adhesive is applied to a substrate and the adhesive on the first substrate is thereafter contacted with a second substrate. In a preferred embodiment, one substrate is glass the other substrate is a plastic, metal, fiberglass or composite substrate (for instance cured sheet molding compound) which may optionally be painted. Thereafter the adhesive is exposed to curing conditions. Preferably the system of the invention can be used to bond glass or plastic coated with an abrasion resistant coating, to other substrates such as metal or plastics. The plastic coated with an abrasion resistant coating can be any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive. The glass or plastic window preferably has a ceramic enamel or organic fit disposed on a portion of the surface of the glass. The glass or plastic can be flat or shaped. Included in shaped glass or plastic is glass or plastic having a curved surface. Preferably, the glass or plastic is used as a window and the ceramic enamel or organic frit is located about the periphery of the glass or plastic. Preferably, the frit is located about the periphery of the glass or plastic such that it is capable of blocking transmission of light to prevent it from contacting the adhesive, which bonds the window into a structure. The frit on the periphery also hides the trim components disposed about the periphery of the window. The glass or plastic is preferably used as a window and preferably used as a window in an automobile. The second substrate is preferably a window frame or a flange of a vehicle adapted to hold a window in place.

In general, the method of bonding glass or plastic, such as a window, to a substrate comprises, applying an adhesive to the surface of the glass or plastic along the portion of the glass which is to be bonded to the structure which has the composition of this invention thereon. Where a ceramic enamel or organic frit is present the adhesive is applied to the surface of the frit. The adhesive is thereafter contacted with the second substrate such that the adhesive is disposed between the window and the second substrate. The adhesive is allowed to cure to form a durable bond between the window and the substrate. Generally, the adhesives are applied at ambient temperature in the presence of atmospheric moisture. Exposure to atmospheric moisture is sufficient to result in curing of the adhesive. Curing may be further accelerated by applying heat to the curing adhesive by means of convection heat or microwave heating. Typically the adhesive is applied as a head having an engineered cross-sectional shape. In the embodiment wherein one of the substrates is to be used as a window the bead is applied around the periphery of the substrate in a manner such that the beginning of the adhesive bead is knitted, contacted with, the end of the bead. This is performed in a manner such that the adhesive bead when cured functions to seal around the periphery of the substrate, such as a window. This is why such adhesive are often referred to as sealants.

As used herein, the term "durable bond" refers to the bond of the adhesive to the substrate surface wherein the bond lasts for a significant portion of the life, or the entire life, of the structure. The durability of a bond is typically predicted utilizing accelerated aging tests. For purposes of this invention, the catalplama test is used. The composition of the invention is applied by saturating a cheesecloth with the solution and applying a thin wet coating to the window surface. Twenty seconds after the application, the adhesive is applied in a bead of 8 to about 10 mm in width and about 6 to about 8 mm in thickness down the length of the substrate. The adhesive is allowed to cure for 7 days at 23° C. and 50 percent Relative Humidity (RH), then the sample is subjected into the catalplasma test. After the desired exposure the samples are tested utilizing the quick knife adhesion test. The results are listed as the percent of cohesive failure (failure within the urethane adhesive) with the desired result being 100 percent CF (cohesive failure). The long-term durability is expressed as the number of days required to lose 100 percent CF. As used herein, a durable bond means that the adhesive under the above-mentioned test exhibits a performance of about 5 days or greater, more preferably about 6 days or greater and most preferably about 8 days or greater.

The preferred embodiment of the present invention has been disclosed. A person of ordinary skill in the art would realize however, that certain modifications would come within the teachings of this invention. Therefore, the following claims should be studied to determine the true scope and content of the invention.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. Parts by weight as used herein refers to compositions containing 100 parts by weight. The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

SPECIFIC EMBODIMENTS OF INVENTION

The following examples are included for illustrative purposes only and are not intended to limit the scope of the invention. Unless otherwise stated, all parts and percentages are by weight.

Preparation of Alkoxysilane Amine Alkoxylate Alcohol Composition

In general, the compositions are prepared by mixing the raw materials as e.g. defined in Table 1. Any commonly known mixing devices can be applied. The order of raw material addition is not critical and mixing can be performed at ambient temperature, particularly between 10 and 40° C.

Test Methods—Cataplasma

In general, for the cataplasma cycling, the samples are stored directly in a climatic chamber at 70° C., 100 percent relative humidity, for 7 days, or wrapped in cotton wool, humidified with sufficient water and sealed in a polyethylene bag to be held thereafter in an oven at 70° C. for 7 days. Next, the samples are placed in a freezer for 16 hours at −20° C., after which the sample is allowed to stand at room temperature for 2 hours. The cycle is repeated multiple times, after which the samples are removed from the bag and subjected to the quick knife adhesion test.

Quick Knife Adhesion Test:

The quick knife adhesion test is performed by applying the compositions on a substrate as described below and thereafter applying a bead of adhesive with a defined geometry of 10 mm (height)×10 to 15 mm width×200 mm length. The adhesive is compressed to a height of about 6 mm. The structure is exposed to conditions as detailed hereinafter. To evaluate adhesion performance, the adhesive strip is cut on edge approximately 10 mm parallel to the substrate and peeled off in a 90 degree angle. Approximately each 10 mm, the peeled off head is cut with a knife to the substrate and the peeling is continued. The peeled samples are rated according to the percent of cohesive failure, meaning failure within the hardened bulk of the adhesive, using the scale 1=approximately 0 percent cohesive failure, 2=approximately 25 percent cohesive failure, 3=approximately 50 percent cohesive failure, 4=approximately 75 percent cohesive failure, 5=approximately 100 percent cohesive failure. The most commonly used notations are a=adhesive exhibits delamination from the substrate, b=adhesive exhibits delamination from the primer, z=Adhesive failure at both edges (left and right side) of the adhesive bead and e=Tacky interface between either adhesive/primer or adhesive/substrate. Peel adhesion ratings of about 4 or greater (75 percent cohesive failure or greater) are considered acceptable.

Sample Preparation

The alkoxysilane amine and alkoxylate alcohol compositions are applied to a substrate through a plastic foam fitted on a primer application bottle. Several different commercial substrates are tested. The substrates designated as Cer are glass substrates having a ceramic enamel on the surface. The adhesion promoter of the invention is applied to the ceramic surface. For substrates designated as glass, the adhesion promoter is applied directly to glass. Representative results of the testing are provided hereinafter. In some tests the compositions are applied in a wipe on manner wherein the water is allowed to evaporate off for the stated open time. In other tests, the compositions are applied in a wipe on wipe off manner, wherein after the stated open time the substrate where the composition is applied is wiped with a paper felt. Thereafter a silanated isocyanate functional adhesive is applied to the surface to which the composition is applied, as described in the Quick Knife Adhesion test.

Formulations Tested

The formulations tested are described in Table 1.

TABLE 1

| Example | Alkoxysilyl amine | Alkoxylated Alcohol | Water |
|---------|-------------------|---------------------|-------|
| 1%      | 0.8[1]            | 0.10                | 99.1  |
| 2%      | 0.8[2]            | 0.10                | 99.1  |
| 3%      | 1.6[2]            | 0.10                | 98.3  |
| 4%      | 2.4[2]            | 0.10                | 97.5  |

[1]Dynasil™ HS 2776 hydrolyzed alkoxysilyl amine (3aminopropy trihydroxysilane).
[2]Dynasil™ HS 1151 hydrolyzed alkoxysilyl amine (3aminopropy trihydroxysilane).

The results are compiled in Table 2. In Table 2 the conditions lasted in the last 3 columns are the exposure conditions before quick knife adhesion testing.

TABLE 2

| Example | Substrate | Application[3] | Open time | 3 days[4] | 7 Days[4] | 7 Days[4] & 7 Days Cataplasma |
|---------|-----------|----------------|-----------|-----------|-----------|-------------------------------|
| 1 | Cer A | A | 1 min | 5 | 5 | 5 |
| 1 | Cer A | A | 8 hours | 5 | 5 | 5 |
| 1 | Cer A | A | 3 days | 5 | 5 | 5 |
| 2 | Cer A | A | 1 min | 5 | 5 | 5 |
| 2 | Cer A | A | 8 hours | 5 | 5 | 5 |
| 2 | Cer A | A | 3 days | 5 | 5 | 5 |
| 1 | Cer B | A | 1 min | 5 | 5 | 5 |
| 1 | Cer B | A | 3 days | 5 | 5 | 5 |
| 1 | Cer B | A | 8 hours | 5 | 5 | 5 |
| 2 | Cer B | A | 1 min | 5 | 5 | 5 |
| 2 | Cer B | A | 8 hours | −5b | 5 | 5 |
| 2 | Cer B | A | 3 days | 5 | 5 | 5 |
| 1 | Cer C | A | 1 min | 5 | 5 | 5 |
| 1 | Cer C | A | 3 days | 5 | 5 | 5 |
| 1 | Cer C | A | 8 hours | 5 | 5 | 5 |
| 2 | Cer C | A | 1 min | 5 | 5 | 5 |
| 2 | Cer C | A | 3 days | 5 | 5 | 5 |
| 2 | Cer C | A | 8 hours | 5 | 5 | 5 |
| 2 | Glass A | A | 20 sec | 5 | 5 | 4-5z |
| 2 | Glass A | B | 20 sec | 5 | 5 | 5 |
| 2 | Cer D | A | 20 sec | 5 | 5 | 5 |
| 2 | Cer D | B | 20 sec | −5z | 5 | 5 |
| 2 | Glass B | A | 20 sec | 4-5a | 5 | 5 |
| 2 | Glass B | B | 20 sec | 5 | 5 | 5 |
| 2 | Cer E | A | 20 sec | −5z | 5 | 5 |
| 2 | Cer E | B | 20 sec | −5z | −5z | −5z |
| 2 | Glass C | A | 20 sec | 5 | 5 | 5 |
| 2 | Glass C | B | 20 sec | 5 | 5 | 5 |
| 2 | Cer F | A | 20 sec | 5 | 5 | 5 |
| 2 | Cer E | B | 20 sec | 5 | −5b | −5z |

[3]Application A = wipe on wipe off; B = wipe on only.
[4]Exposure at 23° C. and 50 percent relative humidity.

Lap Shear Testing

A sample using the adhesion promoter of Example 2 on float glass is prepared as described above. After curing for three days at 23° C. and 50 percent relative humidity, the sample is subjected to lap shear testing. The average lap shear strength at break for three samples was 3.524 MPa. Failure mode at break is 3-4 e or 3-4 ea.

Stability Testing

A sample of Example 2 is placed in a container and stored at 40° C. and 50 percent relative humidity for 12 weeks and the solution shows no precipitation.

Lap Shear—Hydrolyzed Alkoxysilyl Amine Concentration Study

Lap shear samples are prepared using concentrations of 0.8, 1.6 and 2.4 weight percent of hydrolyzed alkoxysilyl amine, Examples 2, 3 and 4 respectively. Samples for each example are allowed to cure at 23° C. and 50 percent relative humidity for 2, 4, 8, 24 and 48 hours respectively. Three duplicates of each test are prepared and tested. The adhesive is BETASEAL™ 1910 urethane based adhesive containing alkoxysilyl groups is utilized. The application method used is Method B. The results are compiled in Table 3.

| | Example | | | | | |
|---|---|---|---|---|---|---|
| Cure time (hr) | 2 (0.8%) Lap Shear (MPa) | 2 (0.8%) Failure Mode | 3 (1.6%) Lap Shear (MPa) | 3 (1.6%) Failure Mode | 4 (2.4%) Lap Shear (MPa) | 4 (2.4%) Failure Mode |
| 2 | 0.099 | 1e | 0.327 | 1e | 0.377 | 1e |
| 4 | 0.688 | 1e | 0.773 | 1e | 0.763 | 1e |
| 8 | 0.387 | 1e | 1.197 | 1e | 1.263 | 1e |
| 24 | 2.315 | 2e | 2.820 | 2e | 2.647 | 2e |
| 48 | 3.633 | 3-4e | 4.317 | 3-4e | 4.107 | 3-4e |
| 72 | 3.524 | 4-5e | 5.673 | −5e and 5 | 5.653 | −5e |

Table 3 illustrates that primers with 1.6 and 2.4 percent of hydrolyzed alkoxysilyl amine show faster cure rates than primers with 0.8 percent of hydrolyzed alkoxysilyl amine.

Example 5

Primers with Alkoxysilyl Terminated Alkoxylated Alcohols

A composition comprising 2.4 percent of hydrolyzed alkoxysilyl amine (DYNASIL™ HS1151 hydrolyzed alkoxysilyl amine), 0.10 percent of alkoxysilyl terminated alkoxylated alcohols (SILQUEST™ A1230 alkoxysilyl terminated alkoxylated alcohols) and 97.5 percent of water is prepared. Application method B is used in preparation of the samples. Quick knife adhesion samples are prepared as described hereinbefore utilizing the composition. The adhesive used in BETASEAL™ 1925 urethane adhesive containing alkoxysilyl groups. The open time from application of primer to application of adhesive is 2 minutes. The results are compiled in Table 4.

TABLE 4

| Test | Substrate | 7 day cure | 7 day cure and 7 day cataplasma | 7 day cure and 14 day cataplasma |
|---|---|---|---|---|
| 1 | Glass | 4a | -5a | 4a |
| 2 | Ceramic Enamel | -5z | -5z | -5z |
| 3 | Ceramic Enamel | 5 | 5 | 5 |
| 4 | Glass | -5a | 4-5a | 2-3a |
| 5 | Ceramic Enamel | -5a | -5a | -5a |
| 6 | Glass | 5 | -5a | 5 |
| 7 | Ceramic Enamel | 5 | 5 | 5 |

Heating of Substrate after Primer Application and Before Adhesive Application

Quick knife samples are prepared using the primer of Example 4 and BETASEAL™ 1925 urethane based adhesive. The substrate is float glass, primer application method is Method B, and the open time is 5 minutes. For two sets of samples the substrate is held at 23° C. and 50 percent relative humidity for 5 minutes before application of the adhesive. For another two sets of samples the samples are held at 50° C. and 50 percent relative humidity for 5 minutes before application of the adhesive. Samples are cured for 3 days, 7 days, 7 days and exposed to cataplasma conditions for 7 days, and cured for 7 days and exposed to cataplasma conditions for 14 days. In Quick Knife adhesion testing all samples scored 5.

What is claimed is:

1. A composition comprising a stable solution of:
   a) from about 0.05 to about 10.0 parts by weight of a hydrolysate of one or more alkoxysilyl amines;
   b) from about 0.05 to about 1.0 parts by weight of one or more alkoxylated alcohols, alkoxysilyl terminated alkoxylated alcohols, fatty acids or fatty acid esters; and,
   c) from about 90 to about 99.9 parts by weight of water:
   wherein the composition contains 100 parts by weight and the composition exhibits a ph of about 9 to about 12.

2. A composition according to claim 1 wherein the one or more alkoxysilyl amines comprise one or more alkoxysilyl alkyl amines, alkoxysilyl polyalkylamines or bis(alkoxysilyl) amines.

3. The composition according to claim 1 wherein part b) comprises one or more alkoxylated alcohols or alkoxysilyl terminated alkoxylated alcohols.

4. The composition according to claim 1 wherein part b) comprises a mixture of two or more alkoxylated alcohols.

5. The composition according to claim 1 wherein the one or more alkoxylated alcohols correspond to the formula; wherein:

$$R^7-(OCH_2)_3O)_a((CH_2)_2O)_b-H)_c$$

and the one or more alkoxysilyl terminated alkoxylated alcohols correspond to the formula

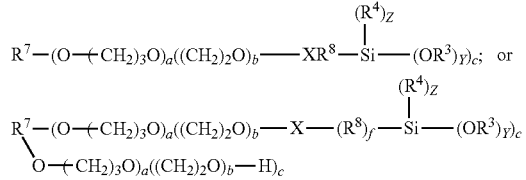

wherein:
$R^3$ is separately in each occurrence a $C_{1-4}$ alkyl group;
$R^4$ is separately in each occurrence a $C_{1-4}$ alkyl group;
$R^7$ is separately in each occurrence a $C_{1-20}$ straight or branched chain alkyl or alkenyl group: $R^8$ is a $C_{1-20}$ hydrocarbylene group;
X is a direct bond or a linking group formed by the reaction of alkoxylated alcohols with an alkoxy silane having a group reactive with a hydroxyl compound;
a is separately in each occurrence is an integer of about 1 to about 3;
b is separately in each occurrence an integer of about 2 to about 10;
c is separately in each occurrence an integer of about 1 to about 6;
f is separately in each occurrence 0 or 1;
Y is separately in each occurrence an integer of from 1 to 3; and
Z is separately and integer of from 0 to 2 provided that Z=3-Y.

6. The composition according to claim 1 wherein the alkoxylated alcohols are derived from seed oils.

7. The composition according to claim 1 wherein the hydrolysate of one or more of alkoxysilyl amines is present in an amount of about 0.5 to about 5.0 parts by weight.

8. A composition according to claim 1 wherein the composition comprises less than 1 percent by weight of organic based solvents.

9. A kit comprising a composition according to claim 1 and an adhesive comprising a prepolymer containing isocyanate functional groups, silane groups or a mixture thereof.

10. A kit according to claim 9 wherein the adhesive comprises a prepolymer containing isocyanate functional groups and the prepolymer further contains silane functional groups or the adhesive further contains a silane functional group containing compound.

11. A process comprising:
   a) applying a composition according to claim 1 to a surface of a first substrate; and
   b) wiping the applied composition off of the surface of the first substrate or allowing a major portion of the water in the composition to evaporate off of the surface of the first substrate.

12. A process according to claim 11 wherein the applied composition is wiped off of the surface of the first substrate.

13. A process according to claim 11 wherein the water in the applied composition is allowed to evaporate off of the surface of the substrate.

14. A process according to claim 13 wherein the water is allowed to evaporate off for at least about 10 seconds.

15. A process according to claim 11 which further comprises contacting the first substrate with an adhesive containing a prepolymer having isocyanate, silane or both functional groups and a second substrate wherein the adhesive is applied to the portion of the surface of the first substrate to which the composition was applied and the adhesive is disposed between the first and the second substrates.

16. A process according to claim 15 wherein the time period between applying the composition to the first surface and contacting the first surface with the adhesive is from about 20 seconds to 8 days.

17. A process according to claim 15 wherein the first substrate is glass or glass having a ceramic or organic frit on the portion of the surface which is bonded to the second substrate.

18. A process according to claim 17 where in the glass substrate is a window and the second substrate is a flange in a vehicle adapted to hold the window in place in the vehicle or the substrate is a window frame in a building.

19. A composition comprising a stable solution of:
   a) from about 0.05 to about 10.0 parts by weight of a hydrolysate of one or more alkoxysilyl amines;
   b) from about 0.05 to about 1.0 parts by weight of one or more alkoxylated alcohols, alkoxysilyl terminated alkoxylated alcohols, fatty acids or fatty acid esters; and,
   c) from about 90 to about 99.9 parts by weight of water:
wherein the composition contains 100 parts by weight and the composition exhibits a ph of about 9 to about 12 and the alkoxysilyl amines correspond to the formula;

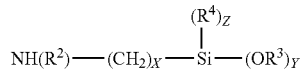

the alkoxysilyl polyalkylamines correspond to the formula;

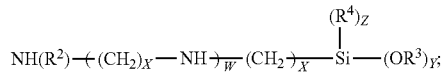

and, the bis(alkoxysilyl)amines correspond to the formula;

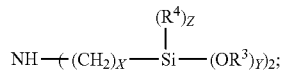

wherein:
   $R^2$ is separately in each occurrence a $C_{1-20}$ hydrocarbyl group;
   $R^3$ is separately in each occurrence a $C_{1-4}$ alkyl group;
   $R^4$ is separately in each occurrence a $C_{1-4}$ alkyl group;
   W is seperately in each occurrence an integer of from about 1 to about 10;
   X is separately in each occurrence an integer of from 1 to 4;
   Y is separately in each occurrence an integer of from 1 to 3; and
   Z is separately and integer of from 0 to 2 provided that X=3-Y.

20. A composition comprising a stable solution of:
   a) from about 0.05 to about 10.0 parts by weight of a hydrolysate of one or more alkoxysilyl amines;
   b) one or more alkoxylated alcohols, alkoxysilyl terminated alkoxylated alcohols, fatty acids or fatty acid esters present in an amount of from about 0.08 to about 0.12 parts by weight, and
   c) from about 90 to about 99.9 parts by weight of water:
wherein the composition contains 100 parts by weight and the composition exhibits a ph of about 9 to about 12.

* * * * *

UNITED STATES PATENT AND TRADEMARK OFFICE
CERTIFICATE OF CORRECTION

| | | |
|---|---|---|
| PATENT NO. | : 8,673,999 B2 | |
| APPLICATION NO. | : 13/577668 | |
| DATED | : March 18, 2014 | |
| INVENTOR(S) | : Schmatloch | |

It is certified that error appears in the above-identified patent and that said Letters Patent is hereby corrected as shown below:

In the Claims:

Column 20, Line 58, delete "and integer", insert --an integer--

Column 22, Line 30, delete "W is seperately in", insert --W is separately in--

Column 22, Line 36, delete "and integer of from 0 to 2 provided that X=3-Y", insert --an integer of from 0 to 2 provided that Z=3-Y--

Signed and Sealed this
Thirtieth Day of September, 2014

Michelle K. Lee
*Deputy Director of the United States Patent and Trademark Office*